United States Patent
Shin (10) Patent No.: US 12,298,929 B2
(45) Date of Patent: May 13, 2025

(54) MASTER DEVICE IDENTIFYING ADDRESS OF SLAVE DEVICE, ELECTRONIC DEVICE INCLUDING THE SAME, AND OPERATING METHOD OF ELECTRONIC DEVICE

(71) Applicant: SK hynix Inc., Icheon-si (KR)

(72) Inventor: Woong Sik Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 85 days.

(21) Appl. No.: 18/299,006

(22) Filed: Apr. 11, 2023

(65) Prior Publication Data
US 2024/0184727 A1 Jun. 6, 2024

(30) Foreign Application Priority Data
Dec. 6, 2022 (KR) .................. 10-2022-0168302

(51) Int. Cl.
  *G06F 13/36* (2006.01)
  *G06F 13/362* (2006.01)
  *G06F 13/42* (2006.01)

(52) U.S. Cl.
CPC ........ *G06F 13/362* (2013.01); *G06F 13/4282* (2013.01)

(58) Field of Classification Search
CPC .......................... G06F 13/362; G06F 13/4282
See application file for complete search history.

(56) References Cited

U.S. PATENT DOCUMENTS

| | | | | |
|---|---|---|---|---|
| 2015/0120975 A1* | 4/2015 | Sengoku | ................. | G06F 13/40 710/110 |
| 2015/0309960 A1* | 10/2015 | Pitigoi-Aron | ....... | G06F 13/4291 710/106 |
| 2017/0083468 A1* | 3/2017 | Sengoku | ............... | G06F 13/364 |
| 2017/0097912 A1* | 4/2017 | Takahashi | ............. | G06F 13/362 |
| 2017/0277651 A1* | 9/2017 | Ngo | ..................... | G06F 13/364 |
| 2018/0150424 A1* | 5/2018 | Miluzzi | ............... | G06F 13/4282 |

FOREIGN PATENT DOCUMENTS

| | | |
|---|---|---|
| KR | 10-2016-0077189 A | 7/2016 |
| WO | 2015065792 A1 | 5/2015 |

\* cited by examiner

*Primary Examiner* — Henry Tsai
*Assistant Examiner* — Harry Z Wang (57) ABSTRACT

A master device identifying the address of the slave device may, when identifying a slave device selected from a candidate group including a plurality of slave devices performing the same operation but having different addresses, store an address list including an address of each of a plurality of slave devices included in the candidate group, may transmit an address signal corresponding to each of the addresses included in the address list to a serial bus, and may identify the address of the slave device based on a level of an identification signal corresponding to the address signal.

16 Claims, 8 Drawing Sheets

MASTER DEVICE IDENTIFYING ADDRESS OF SLAVE DEVICE, ELECTRONIC DEVICE INCLUDING THE SAME, AND OPERATING METHOD OF ELECTRONIC DEVICE

CROSS-REFERENCE TO RELATED APPLICATION

The present application claims priority under 35 U.S.C. § 119(a) to Korean patent application number 10-2022-0168302 filed in the Korean Intellectual Property Office on Dec. 6, 2022, which is incorporated herein by reference in its entirety.

TECHNICAL FIELD

The embodiments of the present disclosure relate to a master device identifying an address of a slave device, an electronic device including the same, and a method of operating the electronic device.

BACKGROUND

Electronic components or electronic parts including integrated circuits for performing various functions may be installed in an electronic device. The mounted electronic components may be connected to a serial bus to transmit various data. A controller controlling an electronic device may transmit data to specific components or receive data from specific components by using unique addresses of components connected to the serial bus.

As components of an electronic device diversify through supply and demand of alternative products or diversification of supply networks for the stable supply of components, there may be installed a component in the electronic device that performs the same operation as other components but having different unique addresses. A controller is required to identify a unique address of a mounted component for communication between mounted components.

SUMMARY

Embodiments of the disclosure may provide a master device capable of identifying an address of a mounted slave device using an address list including addresses of a plurality of slave devices, an electronic device including the same, and a method of operating the electronic device.

In one aspect, embodiments of the disclosure may provide an electronic device including a serial bus, one or more slave devices configured to be selected from a candidate group including a plurality of slave devices that perform the same operation but have different addresses, and to transmit an identification signal of a first level or an identification signal of a second level according to an address signal received from the serial bus, and a master device configured to store an address list including addresses of each of the plurality of slave devices included in the candidate group, to transmit an address signal corresponding to each of the addresses included in the address list to the serial bus, and to identify an address of the slave device based on a level of the identification signal according to the address signal.

In another aspect, embodiments of the disclosure may provide an electronic device including an I2C bus including a serial data line and a serial clock line, one or more slave devices configured to receive an address signal through the I2C bus and to transmit an identification signal of a first level or an identification signal of a second level in response to the address signal, and a master device configured to store an address list including addresses of each of two or more slave devices performing the same operation, to transmit the address signal corresponding to each of the addresses included in the address list through the I2C bus, and to identify an address of the one or more slave devices based on the identification signal received in response to the address signal.

In another aspect, embodiments of the disclosure may provide a master device including an interface configured to provide communication with a serial bus, a memory for storing an address list corresponding to a candidate group, which is a group of a plurality of slave devices performing the same operation but having different addresses, and a control unit configured to transmit an address signal corresponding to each of the addresses included in the address list to the serial bus through the interface, and to identify an address of a slave device based on a level of an identification signal for the address signal.

In another aspect, embodiments of the disclosure may provide an operating method of an electronic device including transmitting an address signal of each of the addresses included in the address list corresponding to a candidate group, which is a group of a plurality of slave devices performing the same operation but having different addresses to the serial bus, receiving an identification signal of a first level or an identification signal of a second level in response to the address signal, and identifying the address of the slave device selected from the candidate group based on a level of the identification signal.

The operating method of an electronic device may include loading a firmware into memory when booting. The transmitting of each address signal to the serial bus may be performed after loading the firmware into memory.

According to embodiments of the present disclosure, a master device may identify an address of a slave device using an address list.

The master device may perform data communication with a mounted slave device among a plurality of slave devices performing the same operation but having different addresses due to diversification of components.

DETAILED DESCRIPTION

Hereinafter, embodiments of the present disclosure are described in detail with reference to the accompanying drawings.

Figure 1:
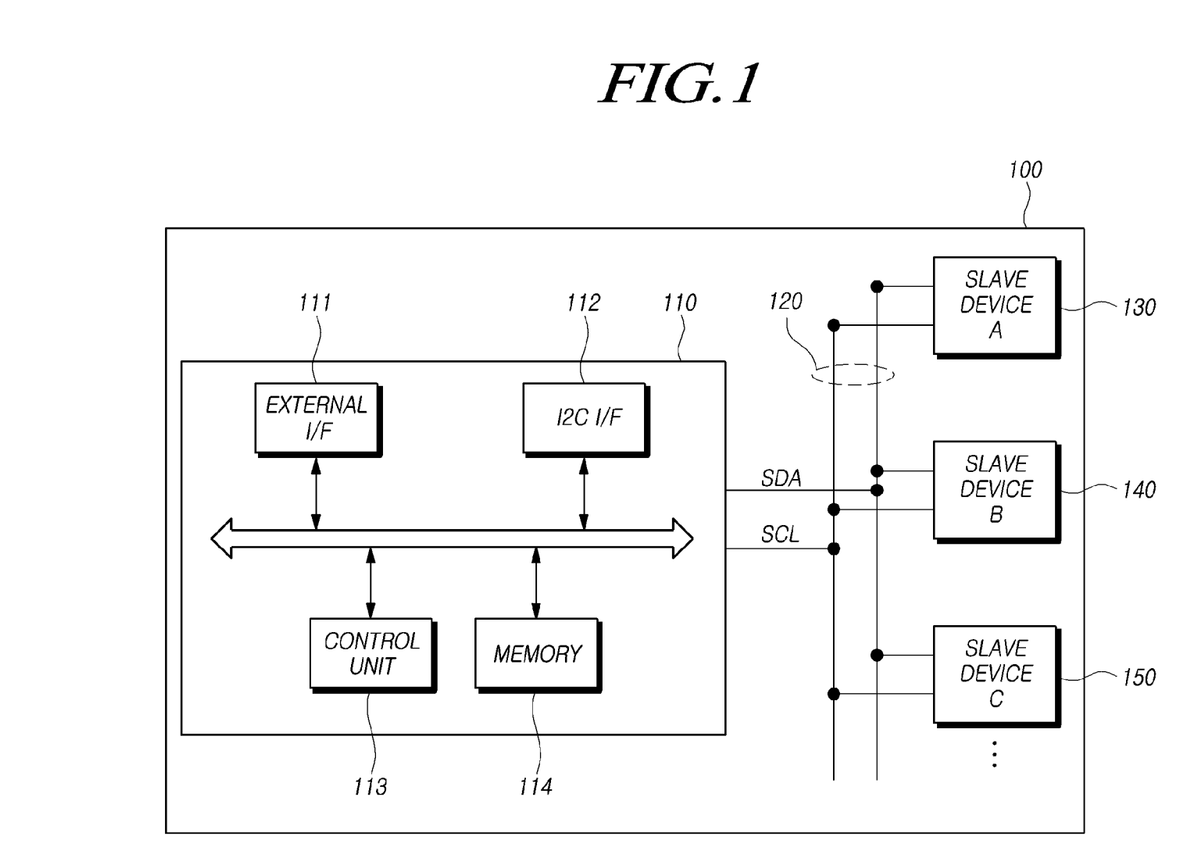
FIG. 1 is a schematic diagram illustrating a configuration of an electronic device according to embodiments of the present disclosure.

FIG. 1 is a schematic diagram illustrating a configuration of an electronic device according to embodiments of the present disclosure.

Referring to FIG. 1, an electronic device 100 may include a master device 110, a serial bus 120 and one or more slave device groups 130, 140, and 150.

The master device 110 may be a device capable of controlling the one or more slave device groups 130, 140 and 150, and may be a controller of the electronic device 100.

The master device 110 may include an external interface 111, an I2C interface 112, a control unit 113 and a memory 114.

The external interface 111 may be an interface for communication between the electronic device 100 and the outside of the electronic device 100 (e.g., a host device). The external interface 111 may support one or more of various communication protocols for communication with the outside.

The I2C interface 112 is an interface for data communication between the master device 110 and the slave device groups. The master device 110 may transmit data to the serial bus 120 through the I2C interface 112 or receive data from the serial bus 120. Alternatively, in some cases, the master device 110 may transmit or receive data through the serial bus 120 using another type of interface other than the I2C interface 112.

The control unit 113 is a component for controlling overall operations of the master device 110 and for performing logical operations. The control unit 113 may be a processor.

The control unit 113 may control the operation of the master device 110 by executing firmware. The control unit 113 may execute (drive) firmware loaded in the memory 114 during booting in order to control overall operations of the master device 110 and to perform logical operations.

The firmware is a program executed in the electronic device 100 to drive the electronic device 100, and may include binary data in which codes for executing respective functions of the electronic device 100 are defined.

The firmware may be loaded into the memory 114 from a non-volatile storage device (e.g., ROM, flash memory) located inside or outside of the master device 110. The control unit 113 may load all or part of the firmware into the memory 114 when performing a booting operation after power-on.

The control unit 113 may perform logical operations defined in firmware loaded in the memory 114 to control the overall operation of the master device 110. The control unit 113 may store a result of performing a logic operation defined by firmware in the memory 114. The control unit 113 may control the master device 110 to generate a command or signal according to a result of performing a logic operation defined in firmware. The control unit 113 may generate an event for loading the corresponding part of the firmware into the memory 114, if the part of the firmware defining the logic operation to be performed is not loaded into the memory 114.

The firmware may be updated while the electronic device 100 is being produced or while the electronic device 100 is running. The control unit 113 may download new firmware from the outside of the electronic device 100 and update the existing firmware to the new firmware.

The memory 114 may store firmware, program codes, commands or data required to drive the master device 110. The memory 114 may be, for example, a volatile memory, and may include one or more of static RAM (SRAM), dynamic RAM (DRAM), and synchronous DRAM (SDRAM).

Components 111, 112, 113, and 114 of the master device 110 may be connected to an internal bus. The internal bus may include a control bus for transferring various control signals, commands, and the like, and a data bus for transferring various data.

Some of the above-described components 111, 112, 113, and 114 of the master device 110 may be deleted or some components may be integrated into a single component. In some cases, one or more other components may be added in addition to the above-described components of the master device 110.

One or more slave device groups 130, 140 and 150 may include various devices for operating the electronic device 100.

For example, a slave device from slave device group 130 communicating with the master device 110 may be a temperature detection device, a buck converter, a capacitor charging device, a load switch, and the like.

The temperature detection device may sense or measure the temperature of a specific component of the electronic device 100 and provide temperature information to the master device 110. For smooth operation of the electronic device 100, monitoring of the temperature of components included in the electronic device 100 is required.

For example, when the electronic device 100 is a storage device, the electronic device 100 may include a memory device for storing data, and performance of the memory device may depend on temperature. The master device 110 may monitor the temperature of the memory device through the temperature detection device, and may manage the temperature of the memory device to maintain operation speed and reliability of data through thermal throttling or thermal shutdown, based on the temperature information received from the temperature detection device.

The slave device, as a temperature detection device, may sense the temperature of the electronic device 100 and provide temperature information to the master device 110 periodically, or may provide an interrupt to the electronic device 100 on reaching a reference temperature, or may provide temperature information upon request of the master device 110.

A buck converter is a type of DC-DC converter capable of stepping down an input voltage to provide an output voltage. Assuming that the electronic device 100 is a storage device, a power supply voltage of the electronic device 100 and a driving voltage required to drive the memory device may be different. In such instances, the buck converter may step down or drop the power supply voltage of the electronic device 100 to a driving voltage required for the memory device to output the driving voltage. The buck converter may store power in an inductor through an internal switching operation, and may discharge the power to output to the outside of the buck converter.

The electronic device 100 may include a capacitor charging device capable of supporting backup power to allow the electronic device 100 to operate with internal power for a certain period of time in the event of a sudden power off. The capacitor charging device may limit input current, block reverse current, and check the state of the capacitor. The master device 110 may set an upper limit of the input current or control a slew rate through communication with the capacitor charging device, and may monitor the state of the capacitor.

The temperature detection device, the buck converter, and the capacitor charging device are merely examples, and the slave device may be various devices capable of communicating with the master device 110 using an address.

Figure 2:
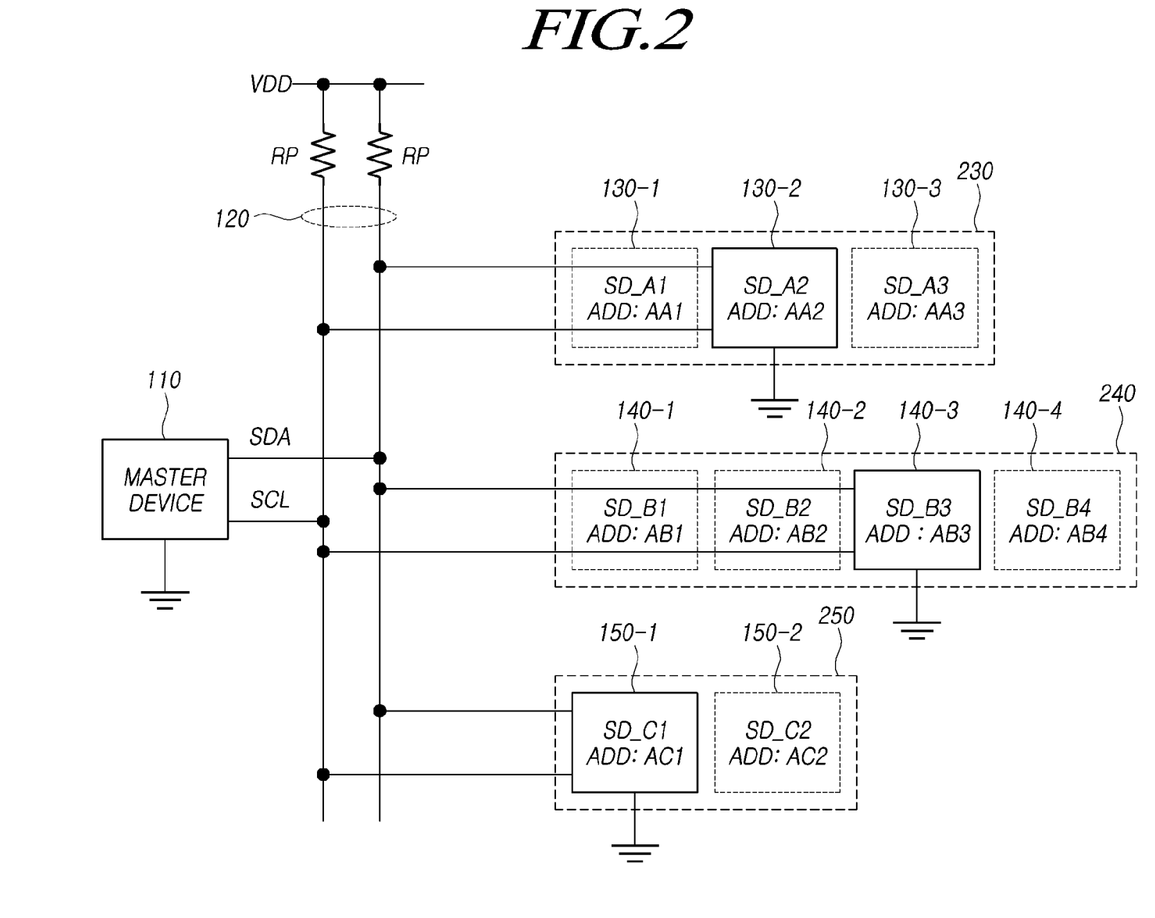
FIG. 2 is a block diagram illustrating an I2C connection with a slave device selected from a candidate group according to embodiments of the present disclosure.

FIG. 2 is a block diagram illustrating an I2C connection with a slave device selected from a candidate group according to embodiments of the present disclosure.

Referring to FIG. 2, one or more slave devices 130-1, 130-2, and 130-3 may be selected from a candidate group 230. The slave devices 130-1, 130-2, and 130-3 may perform the same operation but have different addresses. In addition, one or more slave devices 130-1, 130-2, and 130-3 may transmit an identification signal of a first level or an identification signal of a second level according to an address signal received from the serial bus 120.

The serial bus 120 may be an I2C bus. The I2C bus may include a serial data line SDA and a serial clock line SCL connected to the power supply VDD by a pull-up resistor RP. The master device 110 and the slave device may transmit signals between the master device 110 and the slave devices 130-1, 130-2, and 130-3 by adjusting the voltage level of the serial data line SDA and the serial clock line SCL to a first level or a second level.

The candidate group 230 is a set of slave devices 130-1, 130-2, and 130-3, which can directly be mounted in the electronic device 100, and the slave devices may perform the same function but have different addresses. Components or parts used in the electronic device 100 may be diversified due to supply and demand of alternative products, diversification of supply networks, and the like for stable supply of parts.

In FIG. 2, a first candidate group 230 may include a slave device SD_A1 130-1, a slave device SD_A2 130-2 and a slave device SD_A3 130-3. The addresses ADD of the slave devices SD_A1 130-1, the slave devices SD_A2 130-2 and the slave devices SD_A3 130-3 are AA1, AA2, and AA3 respectively, but these slave devices may perform the same operation even with different addresses.

Similarly, a second candidate group 240 may include a slave device SD_B1 140-1, a slave device SD_B2 140-2, a slave device SD_B3 140-3 and a slave device SD_B4 140-4. The respective addresses ADD of the slave device SD_B1 140-1, the slave device SD_B2 140-2, the slave device SD_B3 140-3 and the slave device SD_B4 140-4 are AB1, AB2, AB3, and AB4 respectively, however, these slave devices may perform the same operation even with different addresses. A third candidate group 250 may include a slave device SD_C1 150-1 and a slave device SD_C2 150-2. In addition, the slave device SD_C1 150-1 and the slave device SD_C2 150-2 have different addresses, AC1 and AC2, but may perform the same operation.

If the first candidate group 230 is a candidate group for a temperature detection device, the second candidate group 240 is a candidate group for a buck converter, and the third candidate group 250 is a candidate for a capacitor charging device, then the slave device SD_A1 130-1, the slave device SD_A2 130-2 and the slave device SD_A3 130-3 are the temperature detection devices, the slave device SD_B1 140-1, the slave device SD_B2 140-2, the slave device SD_B3 140-3 and slave device SD_B4 140-4 are the buck converters, and the slave device SD_C1 150-1 and the slave device SD_C2 150-2 are the capacitor charging devices.

Among the slave devices 130-1, 130-2 and 130-3 included in the first candidate group 230, the slave device SD_A2 130-2 may be selected and installed in the electronic device 100. The master device 110 may communicate with the slave device SD_A2 130-2 using AA2, which is the address of the slave device SD_A2 130-2.

Similarly, the slave device SD_B3 140-3 may be selected from the slave devices 140-1, 140-2, 140-3 and 140-4 included in the second candidate group 240 to be installed in the electronic device 100. In addition, the master device 110 may communicate with the slave device SD_B3 140-3 using address AB3. Among the slave devices 150-1 and 150-2 included in the third candidate group 250, the slave device SD_C1 150-1 may be mounted on the electronic device 100, and the master device 110 may communicate with the slave device SD_C1 150-1 using address AC1.

The master device 110 is required to identify which of the slave devices 130-2, 140-4 and 150-1, selected from among a plurality of slave devices included in the first candidate group 230, the second candidate group 240 and the third candidate group 250, are a temperature detection device, a buck converter, and a capacitor charging device, respectively. In addition, the master device should be able to identify the address of each selected slave device at the same time.

The master device 110 may identify the address of the slave device based on an address list corresponding to each candidate group.

Figure 3:
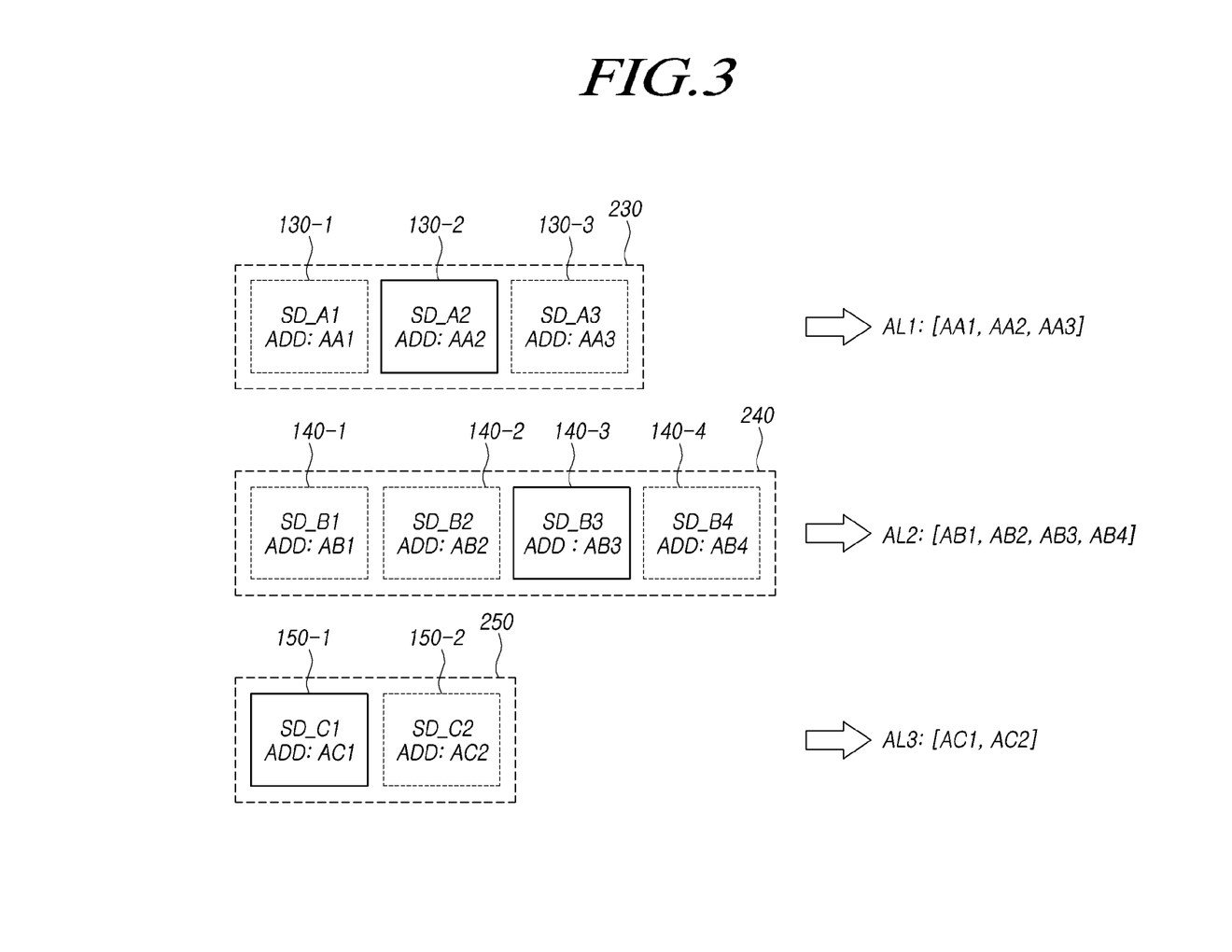
FIG. 3 illustrates an address list corresponding to a candidate group according to embodiments of the present disclosure.

FIG. 3 illustrates an address list corresponding to a candidate group according to embodiments of the present disclosure.

Referring to FIG. 3, an address list AL1 may include addresses AA1, AA2 and AA3 for each of the plurality of slave devices 130-1, 130-2 and 130-3 included in the candidate group 230.

For example, a first address list AL1 may include addresses AA1, AA2 and AA3 of the slave devices 130-1, 130-2 and 130-3 included in the first candidate group 230. Similarly, a second address list AL2 may include addresses AB1, AB2, AB3 and AB4 of the slave devices 140-1, 140-2, 140-3 and 140-4 included in the second candidate group 240. In addition, a third address list AL3 may include the respective addresses AC1 and AC2 of the slave devices 150-1 and 150-2 included in the third candidate group 250.

The master device 110 may store address lists AL1, AL2, and AL3 corresponding to each of the candidate groups 230, 240, and 250. The plurality of addresses AA1, AA2, AA3, AB1, AB2, AB3, AB4, AC1 and AC2 included in the respective address lists AL1, AL2 and AL3 may be different from each other.

As described above in FIG. 2, if the first candidate group 230 is a candidate group for a temperature detection device, the second candidate group 240 is a candidate group for a buck converter, and the third candidate group 250 is a candidate group for a capacitor charging device, then the first address list AL1 may include addresses AA1, AA2 and AA3 of each of the slave devices 130-1, 130-2 and 130-3, which are temperature detection devices that may be mounted in the electronic device 100.

Similarly, the second address list AL2 may include the addresses AB1, AB2, AB3 and AB4 of each of the slave devices 140-1, 140-2, 140-3, and 140-4, which are buck converters that may be mounted in the electronic device 100. The third address list AL3 may include respective addresses AC1 and AC2 of each of the slave devices 150-1 and 150-2, which are capacitor charging devices that may be mounted on the electronic device 100.

When the master device 110 identifies the address of the slave device as one of AA1, AA2, and AA3, the master device 100 may recognize the slave device as a temperature detection device. For example, the master device 110 may communicate with the slave device 130-2, which is a temperature detection device, using an address identified among addresses AA1, AA2, and AA3, and may monitor the temperature of a specific component of the electronic device 100.

Similarly, when the master device 110 identifies the address of the slave device as one of AB1, AB2, AB3, or AB4, the master device 100 may identify the slave device as a buck converter. If the address of the slave device is identified as either AC1 or AC2, the master device 100 may identify the slave device as a capacitor charging device. The master device 110 may communicate with a slave device, which is a buck converter, using an identified address from among addresses AB1, AB2, AB3, and AB4, and may communicate with a slave device, which is a capacitor charging device, using an identified address that is either AC1 or AC2.

Figure 4:
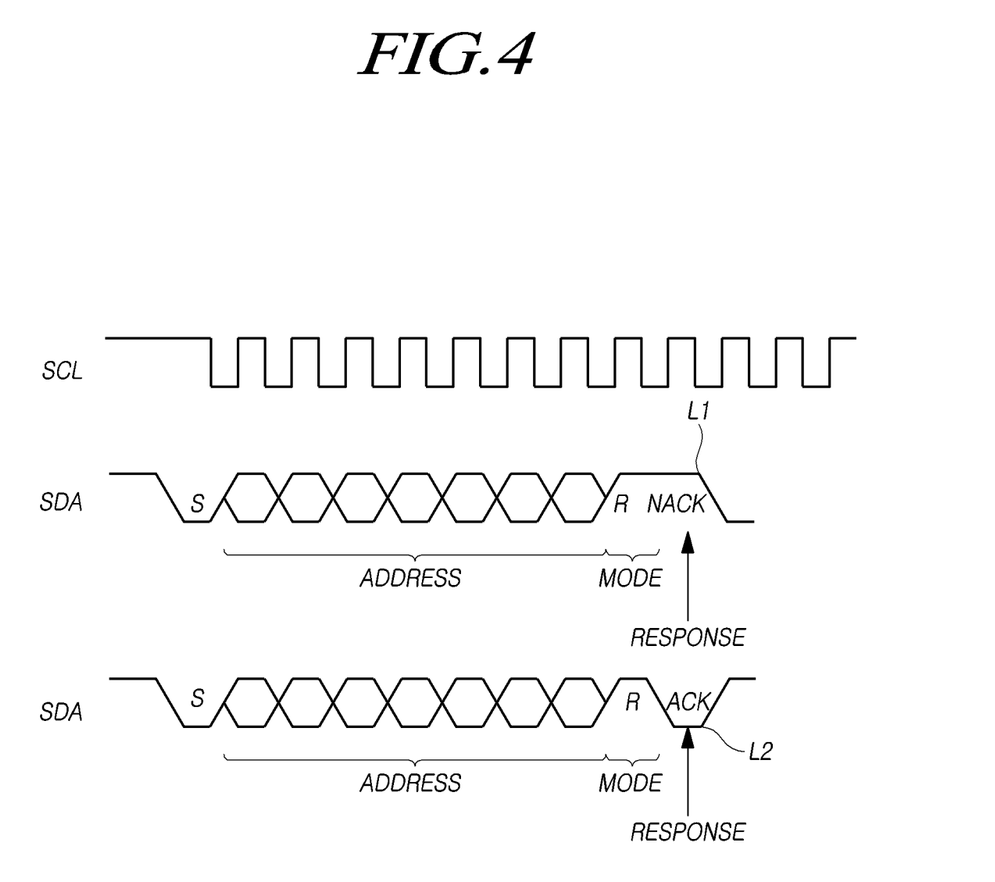
FIG. 4 illustrates a clock, an address signal, and an identification signal according to embodiments of the present disclosure.

FIG. 4 illustrates a clock, an address signal, and an identification signal according to embodiments of the present disclosure.

Figure 5:
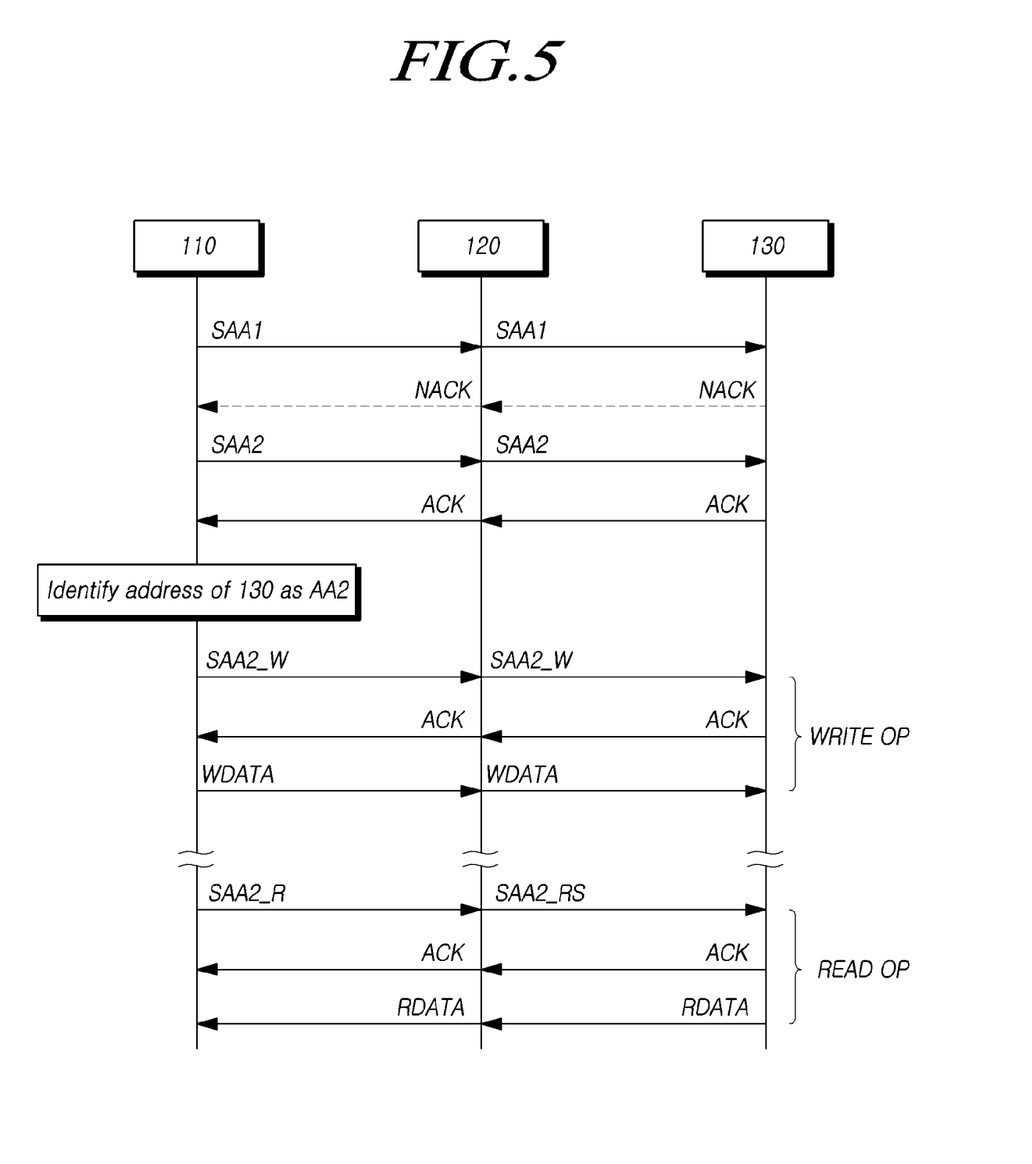
FIG. 5 illustrates operations in which a master device identifies an address of a slave device and communicates with the slave device according to embodiments of the present disclosure.

FIG. 5 illustrates operations in which a master device identifies an address of a slave device and communicates with the slave device according to embodiments of the present disclosure.

Referring to FIG. 4 and FIG. 5, a master device 110 may transmit an address signal corresponding to each of the addresses included in the address list to a serial bus. For example, the master device 110 may sequentially transmit the address signal corresponding to each of the addresses included in the address list to the serial bus for a predetermined period.

The slave device 130 may transmit an identification signal of a first level L1 or an identification signal of second level L2 according to the address signal received from the serial bus 120.

The master device 110 may first transmit a start signal S before transmitting an address signal. The start signal S may be transmitted by changing a level of the serial data line SDA from the first level to the second level L2 (e.g., LOW level) in a state where a level of the serial clock line SCL is at the first level L1 (e.g., HIGH level).

The master device 110 may transmit the address signal, after transmitting the start signal, by changing the level of the serial data line SDL to the first level L1 or the second level L2 for each clock pulse of the serial clock line SCL. The address signal, for example, may have length of 7 bits and may be transmitted for 7 clocks. For example, the master device 110 may transmit bits by setting the first level L1 to 1 and the second level L2 to 0.

For example, the master device 110 may change the level of the serial data line SDA to a level corresponding to 0b1000011 while 7 clock pulses are applied to the serial clock line SCL in order to transmit the address signal corresponding to 0x67.

After transmitting the address signal, the master device 110 may designate an operation mode MODE on the eighth clock. The operation mode MODE may be a read mode or a write mode. If the operation mode MODE is a read mode R at the first level L1, then the slave device 130 may be a transmitter capable of transmitting data to the master device 110, and the master device 110 may be a receiver.

If the operation mode MODE is a write mode W at the second level L2, then the master device 110 may be a transmitter capable of transmitting data to the slave device 130, and the slave device 130 may be a receiver. That is, the operation mode MODE may indicate a transmission direction of data.

The slave device may transmit an identification signal of the first level L1 or an identification signal of the second level L2 at a clock next to the clock for transmitting the operation mode MODE. The identification signal of the first level L1 may correspond to a negative acknowledgment as a NACK signal, and the identification signal of the second level L2 may correspond to a positive acknowledgment as an ACK signal. The slave device 130 may compare the address signal received from the master device 110 with its own address, and transmit an ACK signal corresponding to a positive acknowledgment if both addresses match, and a NACK signal corresponding to a negative acknowledgment if both addresses do not match.

If the master device 110 receives the ACK signal of the second level, then the master device 100 may determine that the slave device 130 corresponding to the transmitted address signal is connected to the I2C bus. Alternatively, if the received NACK signal is of the first level, then the master device 100 may determine that the slave device 130 corresponding to the transmitted address signal is not connected to the I2C bus.

Referring to FIG. 5 in detail, the master device 110 may identify the address of the slave device 130 based on the address list AL1. For example, the master device 110 may first check the plurality of addresses AA1, AA2, and AA3 included in the address list AL1. After transmitting the start signal S, the master device 110 may transmit an address signal SAA1 corresponding to the address AA1 to the serial bus 120, which is an I2C bus. The serial bus 120 may transmit an address signal SAA1 to the slave device 130.

The slave device 130 may compare the address signal SAA1 received from the serial bus 120 with its own address, and if the addresses are different, may transmit a NACK signal corresponding to a negative acknowledgment to the serial bus 120. Transmitting the NACK signal to the serial bus 120 may be holding the voltage level of the serial data line SDA of the serial bus 120 at the first level L1.

Transmitting the NACK signal to the serial bus 120 may be accomplished by holding a voltage level of the serial data line SDA of the serial bus 120 at the first level L1.

The master device 110 may confirm that the slave device having the address AA1 is not connected to the serial bus 120 based on the NACK signal of the first level L1 received from the serial bus 120.

Thereafter, the master device 110 may transmit an address signal SAA2 corresponding to the address AA2 included in the address list AL1 to the serial bus 120. The serial bus 120 may transmit the address signal SAA2 to the slave device 130.

The slave device 130 may compare the address signal SAA2 received from the serial bus 120 with its own address signal. If the addresses are identical, then the slave device may transmit an ACK signal corresponding to a positive acknowledgment through the serial bus 120. Transmitting the ACK signal to the serial bus 120 may be accomplished by holding a voltage level of the serial data line SDA of the serial bus 120 at the second level L2.

The master device 110 may confirm that the slave device 130 of AA2 is connected to the serial bus 120 based on the ACK signal of the second level L2.

The master device 110 may identify the address of the slave device 130 as AA2, and then communicate with the slave device 130 using the address AA2.

In performing a write operation WRITE OP, the master device 110 may be a transmitter for transmitting data, and the slave device 130 may be a receiver. The master device 110 may transmit an address signal SAA2_W designating the write mode W through the serial bus 120. The slave device 130 may transmit the ACK signal of the second level to the serial bus 120 as in the case described above. The master device 110 may check the ACK signal, and then may transmit the write data WDATA to the slave device 130 through the serial data line SDA of the serial bus 120 according to clock timing.

In performing a read operation READ OP, the master device 110 may be a receiver for receiving data, and the slave device 130 may be a transmitter. The master device 110 may transmit an address signal SAA2_R designating the read mode R through the serial bus 120. The slave device 130 may transmit the ACK signal of the second level to the serial bus 120 in response to the address signal SAA2_R, and then may transmit the read data RDATA to the master device 110 through the serial data line SDA of the serial bus 120 according to clock timing.

Through the above-described operations of the master device 110 and the slave device 130, the master device 110 may identify the address of the slave device 130 mounted on the electronic device 100, and may perform bi-directional communication with the slave device 130.

Although one candidate group has been described above as an example, the master device 110 may identify a first slave address based on a first address list corresponding to a first candidate group, and may identify the address of a second slave device based on a second address list corresponding to a second candidate group. That is, the master device 110 may identify addresses of a plurality of slave devices based on an address list corresponding to each of a plurality of candidate groups.

Figure 6:
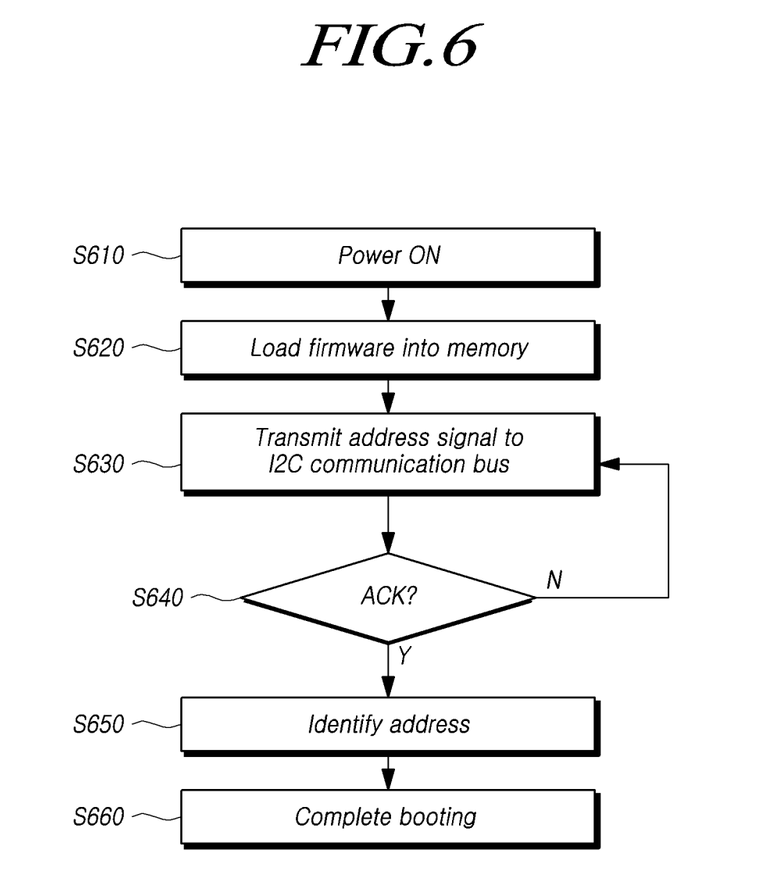
FIG. 6 is a flowchart illustrating a booting process according to embodiments of the present disclosure.

FIG. 6 is a flowchart illustrating a booting process according to embodiments of the present disclosure.

Referring to FIG. 6, a master device 110 may identify addresses of one or more slave devices when booting.

As described above, the master device 110 may perform a step of loading firmware into a memory 114 (S620) after the power-on step (S610) in which power is applied during booting.

A control unit 113 of the master device 110 may execute firmware loaded in the memory 114 to control the operation of the master device 110. The master device 110 may perform, by driving the firmware, a step of transmitting an address signal corresponding to an address included in the address list to an I2C bus corresponding to the serial bus 120 (S630).

The master device 110 may perform a step of determining whether the received identification signal is an ACK signal of a second level (S640). If the identification signal is a NACK signal and not an ACK signal (S640—N), then the master device 110 may perform the step of transmitting the address signal to the I2C bus corresponding to the serial bus 120 (S630) again. However, the master device 110 may transmit a new address signal, which corresponds to an address included in the address list, but has not been transmitted, to the I2C bus. Meanwhile, if the identification signal is the ACK signal (S640—Y), the master device 110 may perform a step of identifying the address as the address of the slave device (S650). Then, booting of the master device 110 (S660) may be completed.

Figure 7:
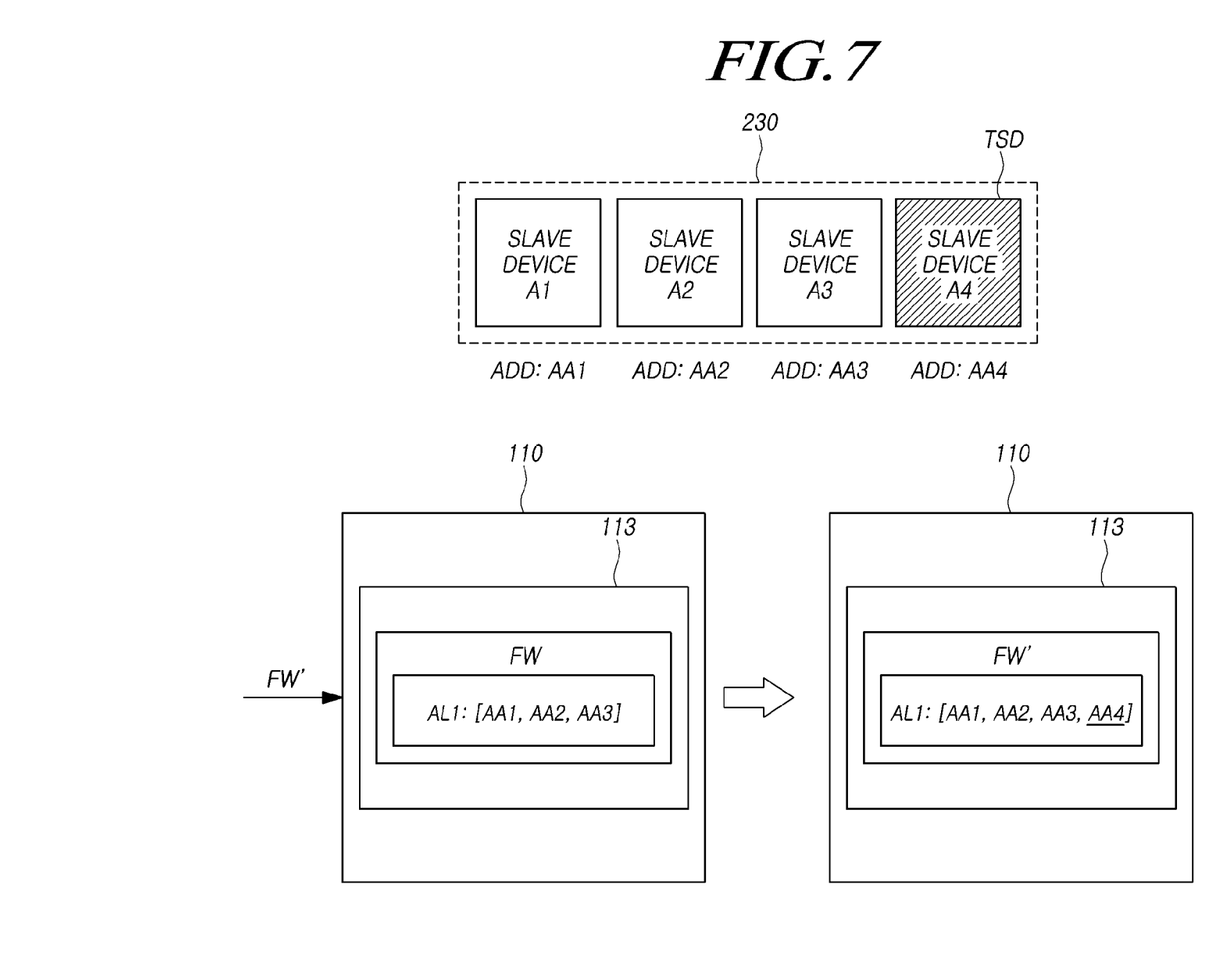
FIG. 7 illustrates an addition of a new slave device to a candidate group according to embodiments of the present disclosure.

FIG. 7 illustrates an addition of a new slave device to a candidate group according to embodiments of the present disclosure.

Referring to FIG. 7, as target slave devices TSDs with different addresses are added to different candidate groups, a master device 110 may update a firmware FW so that an address list AL1 includes an address AA4 of the target slave device TSD, for example.

The address list AL1 may be stored in an area of the firmware FW for the operation of the master device 110. When the firmware is loaded into a memory 114 of the master device 110, the address list AL1 stored in the area of the firmware FW may also be loaded into the memory 114. A control unit 113 may perform data communication with a slave device when controlling the operation of the master device 110 by executing the firmware FW. The control unit 113 may identify the address of the slave device based on the address list AL1 of the firmware FW area.

A new target slave device TSD may be added to a candidate group 230 that includes slave devices. The address of the target slave device TSD is AA4, which corresponds to an address different from AA1, AA2, and AA3 which are addresses of slave devices included in the candidate group 230 before the target slave device TSD is added.

If the target slave device TSD is mounted or installed in the electronic device 100, then in the previous firmware FW, there may be restrictions on identifying the address of the target slave device TSD by the master device 110 based on the address list AL1 before the target slave device TSD is added, or on identifying the operation performed by the slave device by the master device.

The previous firmware FW may be updated to a new firmware FW' corresponding to the address list AL1 including the address AA4 of the target slave device TSD. The new firmware FW' may be updated while the electronic device 100 is being produced or while the electronic device 100 is running.

For example, a target slave device TSD newly included in the candidate group 230 may be mounted during production of the electronic device 100, and after the electronic device 100 is produced, a master device 110 may identify the address of the target slave device TSD based on the address list AL1 on the new firmware FW'.

As another example, a target slave device TSD may be mounted in the process of replacing parts of the electronic device 100. In this case, the electronic device 100 may identify the address of the target slave device TSD based on the address list AL1 on the updated firmware FW' while being executed.

When the new firmware FW' is updated, binary data defining a code corresponding to the new firmware FW' through the external interface 111 of the master device 110 may be transmitted. The binary data may be overwritten in a space where previous firmware FW is stored. After being updated with the new firmware FW', the new firmware FW' may be loaded into the memory 114 during booting.

Figure 8:
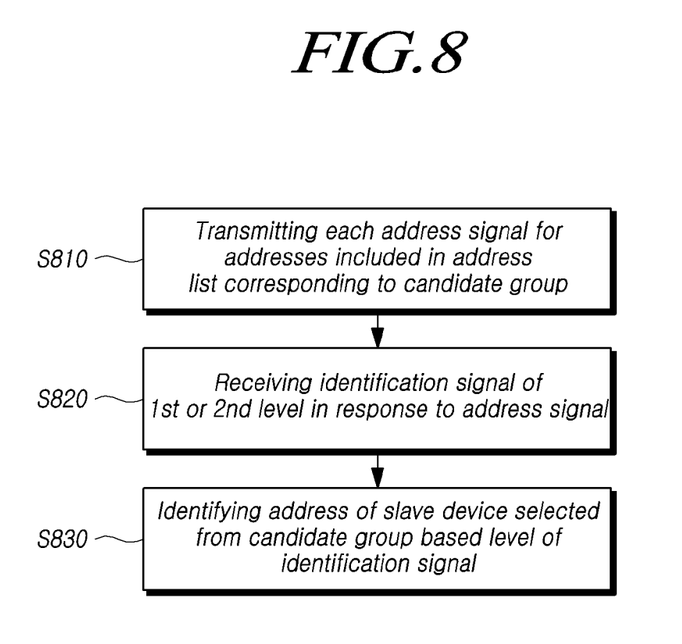
FIG. 8 illustrates an operating method of an electronic device according to embodiments of the present disclosure.

FIG. 8 illustrates an operating method of an electronic device according to embodiments of the present disclosure.

Referring to FIG. 8, an operating method of an electronic device 100 may include a step of transmitting, to the serial bus (S810), an address signal of each of the addresses included in the address list corresponding to a candidate group, which is a group of a plurality of slave devices performing the same operation but having different addresses.

The step of S810 may be performed by a master device 110 included in an electronic device 100.

In addition, the operating method of the electronic device 100 may include a step of receiving an identification signal of a first level or an identification signal of a second level in response to the address signal (S820).

In step S820, a response to the address signal may be transmitted from a slave device 130 to the master device 110.

Additionally, the operating method of the electronic device 100 may include identifying an address of a slave device selected from the candidate group based on the level of the identification signal (S830).

The step S830 may be performed by the master device 110 included in the electronic device 100.

Meanwhile, the operating method of the electronic device 100 may further include loading firmware into a memory 114 when booting.

The step of loading the firmware into the memory 114 may be performed by a control unit 113 included in the master device 110.

The step S810 may be performed by the master device 110 after the step of loading the firmware into the memory.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. An electronic device comprising:
   a serial bus;
   one or more slave devices configured to be selected from a candidate group including a plurality of slave devices that perform the same operation but have different addresses, and to transmit an identification signal of a first level or an identification signal of a second level according to an address signal received from the serial bus; and
   a master device configured to store an address list including addresses of each of the plurality of slave devices included in the candidate group, to transmit the address signal corresponding to each of the addresses included in the address list to the serial bus, and to identify an address of the slave device based on a level of the identification signal according to the address signal,
   wherein the master device sequentially transmits the address signal corresponding to each of the addresses included in the address list to the serial bus for a predetermined period, and
   wherein the master device transmits an address signal corresponding to another address included in the address list when receiving the identification signal of the first level in response to the address signal, and ends transmitting the address signal when receiving the identification signal of the second level in response to the address signal.

2. The electronic device of claim 1, wherein the one or more slave devices comprises a first slave device and a second slave device,
   wherein the master device identifies an address of the first slave device based on a first address list corresponding to a first candidate group, and identifies an address of the second slave device based on a second address list corresponding to a second candidate group.

3. The electronic device of claim 2, wherein each of a plurality of addresses included in the first address list is different from each other.

4. The electronic device of claim 2, wherein each of a plurality of addresses included in the first address list is different from a plurality of addresses included in the second address list.

5. The electronic device of claim 1, wherein the master device identifies the address of the one or more slave devices when booting.

6. The electronic device of claim 1, wherein the one or more slave devices comprise at least one of a temperature detection device, a buck converter, a capacitor charging device or a load switch.

7. An electronic device comprises:
   an I2C bus including a serial data line and a serial clock line;
   one or more slave devices configured to receive an address signal through the I2C bus and to transmit an identification signal of a first level or an identification signal of a second level in response to the address signal; and
   a master device configured to store an address list including addresses of each of two or more slave devices performing the same operation, to transmit the address signal corresponding to each of the addresses included in the address list through the I2C bus, and to identify an address of the one or more slave devices based on the identification signal received in response to the address signal,
   wherein the master device, after transmitting the address signal, controls a level of the serial data line to a first level or a second level according to a clock pulse of the serial clock line and designates an operation mode, and
   wherein, if the level of the serial data line is in a hold state at a next clock pulse after designating the operation mode, the master device transmits the address signal corresponding to an address different from the previously transmitted address among the addresses included in the address list through the serial data line.

8. The electronic device of claim 7, wherein the master device transmits a start signal by changing a level of the serial data line in a state where a level of the serial clock line and a level of the serial data line are the same before transmitting the address signal.

9. The electronic device of claim 7, wherein the master device transmits the address signal while changing a level of the serial data line to a first level or a second level for each clock pulse of the serial clock line.

10. The electronic device of claim 7, wherein the master device, in the operation mode, receives data from the one or more slave devices if the level of the serial data line is the first level, and transmits data to the one or more slave devices if the level of the serial data line is the second level.

11. A master device comprising:
an interface configured to provide communication with a serial bus;
a memory for storing an address list corresponding to a candidate group, which is a group of a plurality of slave devices performing the same operation but having different addresses; and
a control unit configured to transmit an address signal corresponding to each of the addresses included in the address list to the serial bus through the interface, and to identify an address of a slave device based on a level of an identification signal for the address signal,
wherein the control unit transmits an address signal corresponding to another address included in the address list when receiving the identification signal of a first level in response to the address signal, and ends transmitting the address signal when receiving the identification signal of second level in response to the address signal.

12. The master device of claim 11, wherein the interface is an I2C interface.

13. The master device of claim 11, wherein the memory stores a plurality of address lists corresponding to each of a plurality of candidate groups, and the control unit identifies addresses of a plurality of slave devices based on the plurality of address lists.

14. The master device of claim 13, wherein each of the addresses included in the plurality of address lists is different from each other.

15. The master device of claim 11, wherein the address list is stored in an area of firmware for operation of the master device.

16. The master device of claim 15, wherein, when a target slave device having a different address is added to the candidate group, the firmware is updated to include an address of the target slave device in the address list.

* * * * *